Inventor:
August Carl Hussnigg

Patented July 3, 1951

2,559,191

UNITED STATES PATENT OFFICE 2,559,191

DEVICE ON MACHINES MANUFACTURING ENDLESS CABLE CASINGS

August Carl Hussnigg, Zurich, Switzerland

Application January 18, 1945, Serial No. 573,410
In Switzerland September 14, 1943

Section 1, Public Law 690, August 8, 1946
Patent expires September 14, 1963

7 Claims. (Cl. 93—80)

Machines are already known, by means of which spiral-shaped, grooved, flexible tubes and pipes are manufactured in such a manner that band-shaped material rotating on supply-coils and overlapping onto a mandrel, are wound up thereon, the tube manufactured out of such band-shaped material being removed from the mandrel and compressed by a threaded support, which performs the spiral-shaped grooving, this support being composed of a grooving-nut and a grooving-worm. It has also already been proposed to employ such tubes or pipes as cable-casings, the grooving-worm arranged to be hollow, and the cable being led through it, whereby the grooved tube manufactured out of such bands, after leaving the threaded support, is compressed directly on the cable. However, inasmuch as the diameter of the cable fed through the hollow grooving-worm is very much smaller than the inner diameter of the band-material, which is wound up on the winding-mandrel, enclosing the grooving-worm, and is removed from this mandrel, it has been established that cable-casings of such nature, particularly in the case of cables of small diameter, are not sufficiently tightly seated on to the cable. On the other hand, it is not possible to effect a subsequent pressing of the already formed cable-casing on to the cable, as such operations would cause deformations and damage the cable-casing. In this connection, it must, however, be stated that it is possible to attain a certain reduction of the inner diameter, by effecting a compressing operation of the grooves, in a longitudinal direction, within a ring-gauge narrowing the outer diameter of the casing, if this compression is carried out immediately after grooving. The reduction of the inner diameter attained in this manner is, however, not sufficient, particularly in the case of cables of small diameter, when the difference to be equalized between the diameter of the cable and the inner diameter of the casing is relatively great; by such operations, the casing obtains a wall-thickness, which does not justify the expenses required for a considerable additional amount of band-material. All these disadvantages are eliminated by the present invention.

The object of the present invention is to provide a device for manufacturing spirally grooved endless cable cases from strip material by means of which the cable material is removed from rotating supply reels and wound in overlapped position upon a hollow mandrel through which the cable is guided. The tube manufactured out of the strip material is provided with a spiral shaped groove by means of a device located in front of the mandrel and composed of a rotating grooving-nut and a grooving-worm rotating in the same direction between which spiral or helical grooves are impressed into the tube material. As the nut and the worm are stationary in axial direction, the spiral threads of the rotating nut and worm will cause the tube wound upon the mandrel to be pulled off and continuously fed through the grooving device. After leaving the grooving device, the now grooved tube is axially compressed by means checking or retarding the travel of the tube, as are more fully described in U. S. Patents 2,002,896 and 2,033,717. Tests have shown that during the grooving process of the tube, a gradual reduction of the tube diameter takes place which in connection with the compression of the grooved tube causes a further reduction of the tube diameter sufficient for all practical purposes and effecting a satisfactory firm seating of the cable casing on the cable. The reduction of the diameter of the cable casing is accomplished by providing the aforesaid grooving device comprising a rotating grooving nut and worm with threads the diameters of which are tapered relative to the common longitudinal axis of the nut and the worm in the direction of the tube movement. These threads may be single or multiple ones. It is advantageous to provide at the discharge end of the thread or threads of the grooving nut a decrease in the diameter of the crest or apex circle of the thread or threads, whereby a deeper grooving of the grooves is attained at the last moment of the grooving. In case of multiple threads the radial enlargement of the thread end must of course be arranged at the end of each thread.

In the accompanying drawing several now preferred embodiments are shown by way of illustration and not by way of limitation.

Figure 1:
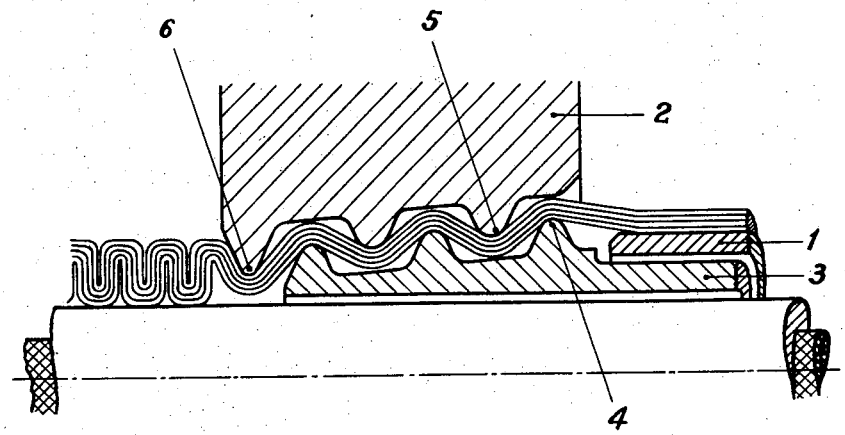
Fig. 1 shows a longitudinal elevational section of a device according to the invention.

Referring now to the figures in detail, the hollow winding mandrel of the device is designated by 1 and the strip material for forming the cable casings is fed to the mandrel from conventional supply reels (not shown). The grooving device is disposed adjacent to mandrel 1. It comprises a rotating grooving nut 2 and a grooving worm 3 rotating in the same direction. Worm 3 is hollow to permit passage of a cable to be encased, Grooving devices of the general type, above referred to, are fully described in the aforementioned U. S. Patents 2,002,896 and 2,033,717. The grooving-worm 3 is provided with a thread 4 which is tapered in the direction of the movement of the cable casing. Correspondingly, grooving nut 2 is provided with a thread 5 which is tapered in the direction of the movement of the cable casing. This thread 5 is extended approximately a quarter of a thread beyond the discharge end of thread 4 of the grooving-worm 3. At this extension of thread 5, the depth of the thread is increased by providing an inwardly radially enlarged thread portion 6 whereby the spiral grooves previously produced by the grooving device are more deeply impressed. As previously mentioned, the grooving nut 2 and grooving-worm 3 can have single or multiple threads.

Figure 2:
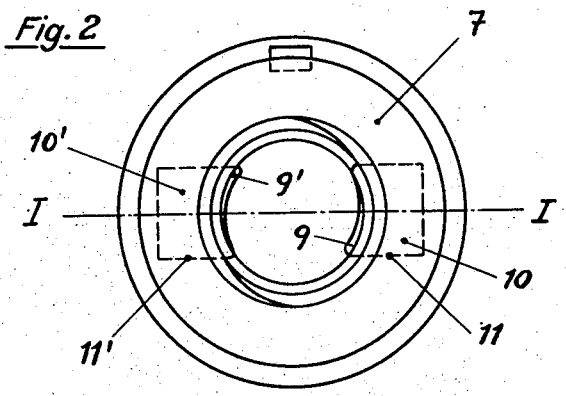
Fig. 2 is a front view of a modification of the grooving nut of a device on an enlarged scale.
Figure 3:
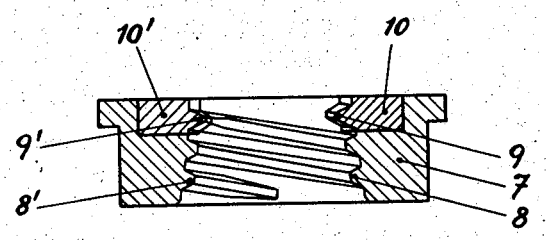
Fig. 3 is a section taken on line I—I of Fig. 2.

The greatest wear and tear of thread 5 of the grooving nut occurs at the inwardly directed thread portion 6 of the thread. It is, therefore, advisable to provide for portion 6 an exchangeably disposed member on nut 2 as shown on Figs. 2 and 3. These figures also show a grooving nut 7 having two spiral threads 8 and 8', the beginning of one spiral thread being shown at the upper part of Fig. 2 and the beginning of the second thread at the lower part of this figure. At the discharge ends of these threads 8 and 8', and as a continuation thereof, radially inwardly enlarged thread portions 9 and 9' are provided which are inserted in the body of the grooving-nut by means of inserts 10 and 10'. These inserts are guided by radially arranged guides 11 and 11'.

What is claimed is:

1. In a device of the type described for manufacturing spirally grooved endless cable-casings from strip material, a grooving nut and a grooving worm mounted concentrically within the nut and spaced therefrom for the passage of the casing material, said nut provided with an internal thread and said worm with an external thread, the diameters of said threads being tapered relative to the common longitudinal axis of the nut and the worm toward the discharge ends of the nut and the worm.

2. A device as described in claim 1, wherein said nut and worm, each comprise multiple threads.

3. In a device of the type described for manufacturing spirally grooved endless cable casings from strip material, a grooving nut and a grooving worm mounted concentrically within the nut and spaced therefrom for the passage of the casing material, said nut provided with an internal thread and said worm with an external thread, the diameters of said threads being tapered relative to the common longitudinal axis of the nut and the worm toward the discharge ends of the nut and the worm, a portion of the tapered thread of the nut at the discharge end thereof radially inwardly extended, thereby increasing the depth of the thread at the said thread portion.

4. In a device of the type described for manufacturing spirally grooved endless cable casings from strip material, an internally threaded grooving nut and an externally threaded grooving worm mounted concentrically within the nut and spaced therefrom for the passage of the casing material, the diameters of said threads tapered relative to the common longitudinal axis of the nut and the worm toward the discharge of the nut and the worm, the length of the thread of the nut at the discharge end thereof being extended beyond the length of the worm thread, and the diameter of the crest circle of the thread at said extended thread portion being reduced relative to the common longitudinal axis of the nut and the worm, thereby increasing the depth of the said thread portion.

5. In a device of the type described for manufacturing spirally grooved endless cable casings from strip material, an internally threaded grooving nut, an externally threaded grooving worm mounted concentrically within the nut and spaced therefrom for the passage of the casing material, the diameters of said threads tapered relative to the common longitudinal axis of the nut and the worm toward the discharge ends of the nut and the worm, and a member having an internal thread supported and constructed to constitute an extension of the thread of the nut at the discharge end thereof, the diameter of the crest circle of the thread extension being smaller than the crest circle diameter of the adjacent thread portion of the grooving nut for increasing the depth of the grooving of the casing material by the thread extension.

6. In a device of the type described for manufacturing spirally grooved endless casings from strip material, an internally threaded rotatable grooving nut, and an externally threaded rotatable grooving worm mounted concentrically within the nut and spaced therefrom for the passage of the casing material, the diameters of said threads tapered relative to the common longitudinal axis of the nut and the worm toward the discharge ends of the nut and the worm, and a member having an internal thread, said member being inserted in a corresponding recess at the discharge end of the grooving nut and positioned to constitute an extension of the thread of the nut at the discharge end thereof, the diameter of the crest circle of the thread extension being smaller than the diameter of the crest circle of the adjacent thread portion of the grooving nut for causing a deepened grooving of the casing material by the thread extension.

7. In a device of the type described for manufacturing spirally grooved endless cable casings from strip material, an internally threaded rotatable grooving nut, an externally threaded rotatable grooving worm mounted concentrically within the nut and spaced therefrom for the passage of the casing material, the diameters of said threads tapered relative to the common longitudinal axis of the nut and the worm toward the discharge ends of the nut and the worm, and a member having an internal thread, said member inserted slidably in radial direction in a corresponding radial recess at the discharge end of the grooving nut and positioned to constitute an extension of the thread of the nut at the discharge end thereof, the diameter of the crest circle of the thread extension being smaller than the diameter of the crest circle of the adjacent thread portion of the grooving nut for causing a deepened grooving of the casing material by the thread extension.

AUGUST CARL HUSSNIGG.

REFERENCES CITED

The following references are of record in the file of this patent:

UNITED STATES PATENTS

| Number | Name | Date |
|---|---|---|
| 2,002,896 | Kopetz | May 28, 1935 |
| 2,033,717 | Kopetz | Mar. 10, 1936 |